(12) United States Patent
Kinlen et al.

(10) Patent No.: US 11,365,705 B2
(45) Date of Patent: Jun. 21, 2022

(54) LAMINATES OF POLYSILAZANE AND CARBON FIBER REINFORCED POLYMER

(71) Applicant: The Boeing Company, Chicago, IL (US)

(72) Inventors: Patrick J. Kinlen, Chicago, IL (US); Randy J. Grove, Chicago, IL (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 16/170,966

(22) Filed: Oct. 25, 2018

(65) Prior Publication Data
US 2020/0132018 A1    Apr. 30, 2020

(51) Int. Cl.
*F02K 1/82* (2006.01)
*B32B 3/12* (2006.01)
(Continued)

(52) U.S. Cl.
CPC ............... *F02K 1/827* (2013.01); *B32B 3/12* (2013.01); *B32B 3/266* (2013.01); *B32B 7/12* (2013.01); *B32B 15/08* (2013.01); *B32B 15/20* (2013.01); *B64D 33/06* (2013.01); *F02K 1/54* (2013.01); *B32B 2255/10* (2013.01); *B32B 2255/26* (2013.01); *B32B 2262/106* (2013.01); *B32B 2305/024* (2013.01); *B32B 2307/206* (2013.01); *B32B 2307/714* (2013.01); *B32B 2605/18* (2013.01); *F05D 2220/323* (2013.01);
(Continued)

(58) Field of Classification Search
CPC ... F02K 1/827; F02K 1/54; B32B 3/12; B32B 3/266; B32B 15/08; B32B 15/20; B32B 2255/10; B32B 2255/26; B32B 7/12; B32B 3/26; B32B 2262/106; B32B 2305/024; B32B 2307/206; B32B 2307/714; B32B 2605/18; B64D 33/06; F05D 2220/323; F05D 2260/96; F05D 2300/514; F05D 2300/603; Y10T 428/24479; Y10T 428/24165; Y10T 428/24157; Y10T 428/24149; Y10T 428/24273; Y10T 428/24298; Y10T 428/24306; Y10T 428/24314; Y10T 428/24322; Y10T 428/24347; Y10T 428/24339; Y10T 428/24331; B01J 20/28045; B01D 39/2055; B01D 39/2065
USPC .......................................... 428/116, 131, 137
See application file for complete search history.

(56) References Cited

U.S. PATENT DOCUMENTS

| | | |
|---|---|---|
| 4,395,460 A | 7/1983 | Gaul |
| 5,120,686 A | 6/1992 | Gallo |
| (Continued) | | |

FOREIGN PATENT DOCUMENTS

| | | |
|---|---|---|
| EP | 0 586 000 | 3/1994 |
| WO | WO 2008/141201 | 11/2008 |

OTHER PUBLICATIONS

Extended European Search Report prepared by the European Patent Office in application No. EP 19 20 2362.0 dated Mar. 19, 2020.
(Continued)

*Primary Examiner* — Catherine A. Simone
(74) *Attorney, Agent, or Firm* — McDonnell Boehnen Hulbert & Berghoff LLP

(57) ABSTRACT

Disclosed are laminates comprising a carbon fiber reinforced polymer sheet and a layer of polysilazane and methods for producing such laminates.

20 Claims, 6 Drawing Sheets

(51) Int. Cl.
*B32B 3/26* (2006.01)
*B32B 15/08* (2006.01)
*B32B 15/20* (2006.01)
*B32B 7/12* (2006.01)
*F02K 1/34* (2006.01)
*F02K 1/54* (2006.01)

(52) U.S. Cl.
CPC .... *F05D 2260/96* (2013.01); *F05D 2300/514* (2013.01); *F05D 2300/603* (2013.01)

(56) References Cited

U.S. PATENT DOCUMENTS

| | | | |
|---|---|---|---|
| 5,738,750 A * | 4/1998 | Purinton | H01Q 1/424 156/325 |
| 6,051,302 A | 4/2000 | Moore | |
| 6,329,487 B1 | 12/2001 | Abel et al. | |
| 2006/0118357 A1 * | 6/2006 | Braun | B29C 70/545 181/290 |
| 2013/0122763 A1 | 5/2013 | Fish et al. | |
| 2013/0280470 A1 * | 10/2013 | Norly | B32B 5/06 428/76 |
| 2013/0345356 A1 | 12/2013 | Bulluck | |
| 2014/0342030 A1 * | 11/2014 | Nakatsuka | B29C 33/56 425/385 |
| 2018/0104726 A1 * | 4/2018 | Tracey | B29C 33/3835 |
| 2018/0111338 A1 | 4/2018 | Xu et al. | |

OTHER PUBLICATIONS

"HS-922 Extreme Waterproofing" Huntington Specialty Materials at http://huntspecmat.com/hs-922-extreme-waterproofing/, Sep. 20, 2018, 3 pages.

"Safety Data Sheet" Huntington Specialty Materials (Jul. 6, 2018), 5 pages.

"Material Safety Data Sheet" AGS TutoProm, Permanent anti graffiti coating (Feb. 14, 2008), 5 pages.

Merck Safety Data Sheet "Durazane 1500 Rapid Cure (5 Kg)" (Aug. 12, 2015), 12 pages.

* cited by examiner

US 11,365,705 B2

LAMINATES OF POLYSILAZANE AND CARBON FIBER REINFORCED POLYMER

FIELD

This disclosure relates to laminates comprising a sheet of carbon fiber reinforced polymer and a polysilazane layer.

BACKGROUND

Fiber reinforced polymers (FRPs) are widely used to create structural elements and parts used in aerospace, automotive, watercraft, sporting goods, and civil/structural engineering applications among others. FRPs are strong, light-weight materials with high strength-to-weight ratios. FRPs typically are formed by combining fibers and an uncured binding polymer and then curing the binding polymer. A particular type of FRP is carbon fiber reinforced polymer (CFRP). CFRPs are increasingly common and have many different applications.

CFRPs are used in various devices in combination with metal components. For example, aircraft engine thrust reverser inner walls often employ a cellular core, typically in a honeycomb configuration, and a skin of CFRP connected to the core. The CFRP skin of a thrust reverser wall is normally perforated to reduce noise produced by air flowing through the cavity adjacent the thrust reverser wall.

CFRPs are also used in combination cellular cores to make equipment for various sports. Examples of such equipment include bicycle disc wheels, skis, and snowboards.

Unless the CFRP and metal components are completely isolated electrically from each other, the combination of CFRP and a metal component under appropriate conditions (conditions permitting galvanic coupling) will result in a flow of electrons from the metal to the CFRP, i.e., galvanic corrosion or, in other words, oxidation of the metal.

As a result, there is a need to protect devices in which metal components, e.g., aluminum honeycomb core material used in aircraft engine thrust reversers, are electrically connected or galvanically coupled to CFRP from oxidation caused by moisture.

SUMMARY

This disclosure provides a solution to the problem of galvanic corrosion of metal components in devices in which the metal component is in electrical or galvanic communication with CFRP. This solution involves using a polysilazane or mixture thereof as a barrier material between CFRP and/or a metal component and oxygen or moisture in the environment surrounding the device.

Thus, this disclosure involves applying a coating of a polysilazane onto the CFRP to prevent water and oxygen from contacting the carbon fibers within CFRP. As a result, an oxidation/reduction reaction is prevented or inhibited by blocking or substantially diminishing the reduction of oxygen in or at the surface of a CFRP, i.e., the CFRP does not act as a cathode, and the metal component does not act as an anode. The metal component therefore does not function as an anode and does not lose electrons; in short, it is not oxidized and does not become corroded.

Alternatively, a polysilazane or mixture thereof is applied to the metal component to prevent galvanic communication with the CFRP by inhibiting water and electrolyte from creating an electrical or galvanic connection between the metal component and CFRP.

In one aspect, this disclosure provides a laminate comprising a sheet of carbon fiber reinforced polymer (CFRP) coated with a layer of polysilazane.

In another aspect, this disclosure provides a laminate comprising a sheet of carbon fiber reinforced polymer (CFRP), the sheet having a first side and a second side opposite the first side; and a layer of polysilazane covers the first side of the sheet of CFRP.

In another aspect, this disclosure provides a device comprising a metal cellular core adjacent a sheet of carbon fiber reinforced polymer (CFRP), the sheet having a first side and a second side opposite the first side; wherein the metal cellular core is coated with a layer of polysilazane.

In another aspect, this disclosure provides a method for inhibiting oxidation of a metal structure electrically connected to a sheet of carbon fiber reinforced polymer (CFRP), the method comprising applying a liquid polysilazane composition to the sheet of CFRP and allowing the composition to cure.

In an aspect, this disclosure provides a method for inhibiting oxidation of a metal structure which is adjacent to a sheet of carbon fiber reinforced polymer (CFRP), the method comprising applying a liquid polysilazane composition to the metal structure and allowing the composition to cure.

DETAILED DESCRIPTION

Figure 1:
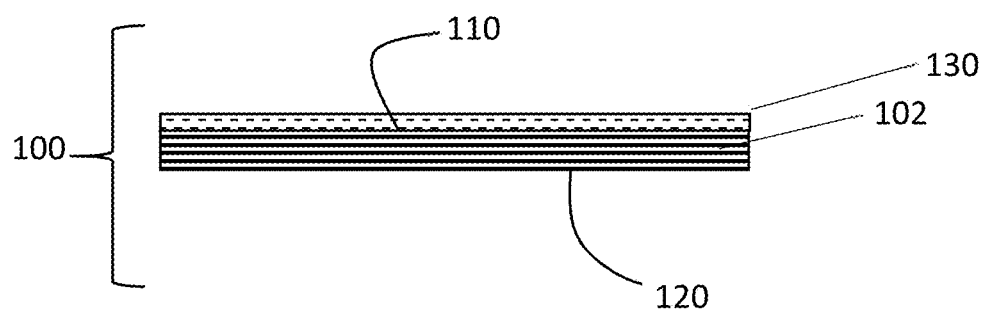
FIG. 1 is a side cutaway view of a laminate of this disclosure.

"Polysilazane" as used herein means oligomers, cyclic, polycyclic, linear polymers, or resinous polymers having multiple Si—N repeating units in the compound.

"Electrical communication" and "galvanic communication" are used interchangeably herein and refer to sufficient connection between materials to permit the transfer or movement of electrons between the materials.

This disclosure addresses galvanic corrosion of metal components in devices in which the metal component is in electrical or galvanic communication with CFRP. The terms metal and metal alloy are used interchangeably herein. This disclosure involves using a polysilazane or mixture thereof as a barrier material between CFRP and/or a metal component and oxygen or moisture in the environment surrounding the device.

Devices with metal components connected to CFRP are seldom manufactured in a way that completely isolates these parts from each other. The metal components in these devices are therefore susceptible to oxidation and corrosion. For example, the perforations in some CFRP sheets, such as, for example, thrust reverser wall skins, have exposed carbon fibers which allows oxygen to contact the carbon fibers within the skin. Thus, when the cellular core of, e.g., a thrust reverser wall is fashioned from a metal, e.g., aluminum or aluminum alloy, and in contact with CFRP, the aluminum is susceptible to oxidation and corrosion.

Further, oxidation and corrosion are increased in damp or wet environments due to water and electrolyte bridging between CFRP and the metal components. The galvanic corrosion process increases the corrosion rate of aluminum over the rate that would normally occur when the aluminum is not galvanically coupled to the CFRP by a factor of 100 or more.

Thus, this disclosure involves applying a coating of a polysilazane or mixture of polysilazanes, typically as a solution or suspension of polysilazane in a solvent, onto the CFRP and allowing the coating to cure, which results in a laminate having a layer of polysilazane on the CFRP that is water-proof and has excellent water-shedding characteristics. The polysilazane layer prevents water and oxygen from contacting the exposed carbon fibers within CFRP. This, in turn, prevents an oxidation/reduction reaction between the CFRP and the metal component by blocking or substantially diminishing the reduction of oxygen in or at the surface of a CFRP, i.e., the CFRP does not act as a cathode, and the metal component does not act as an anode. The metal component therefore does not lose electrons; in short, the metal component is not oxidized and does not become corroded.

As an alternative or in addition to coating the CFRP, a polysilazane or mixture thereof is applied to the metal component to prevent galvanic communication with the CFRP by inhibiting water and electrolyte from creating an electrical or galvanic connection between the metal component and CFRP.

This disclosure provides laminates comprising a sheet of carbon fiber reinforced polymer (CFRP) coated with one or more polysilazanes. The polysilazane coating may be a single layer of a plurality of layers. The polysilazanes are typically applied as a liquid polysilazane composition. These compositions are a formulation of the polysilazane or a mixture of polysilazanes in a carrier liquid, i.e., a solution or suspension of the polysilazane(s) in a solvent system.

Figure 2:
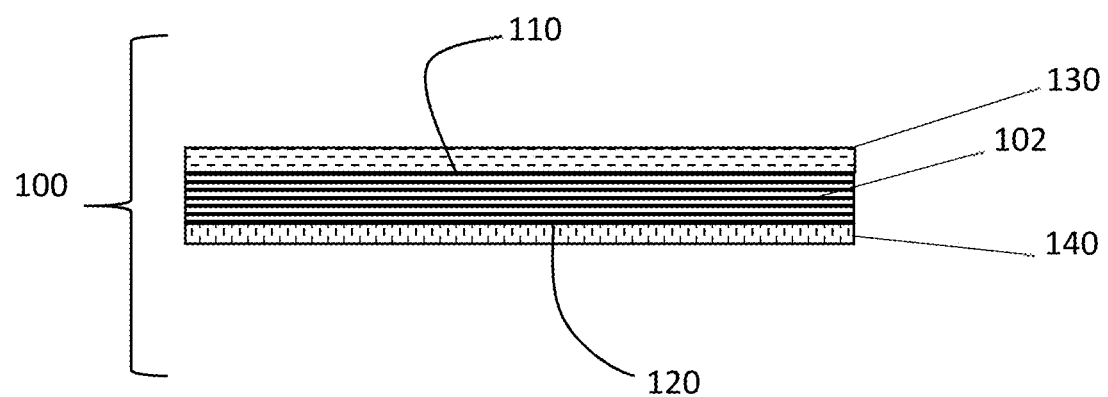
FIG. 2 is a side cutaway view of a laminate of this disclosure.

As shown in FIG. 1 and FIG. 2, this disclosure provides a laminate 100 comprising a sheet of carbon fiber reinforced polymer (CFRP) 102 and polysilazane coating. CFRP sheet 102 has a first side 110 and a second side 120 opposite the first side. The coating covers at least a portion of one side of sheet 102.

The polysilzane composition can be applied to one or both sides of the sheet so that, after cure, there is a polysilazane coating on one side or on both sides of sheet 102. Thus, as shown in FIG. 1, laminate 100 can comprise a CFRP sheet 102, the sheet having a first side 110 and a second side 120 opposite the first side; and a layer of polysilazane 130 covering at least a portion of first side 110 of the sheet 102. This prevents water accumulation and an oxidation/reduction reaction. Additional corrosion protection can be obtained by applying polysilazane to both sides of sheet 102. This alternative is shown in FIG. 2, where CFRP sheet 102 has first side 110 and second side 120 opposite the first side 110; and layer of polysilazane 130 covering first side 110 and layer of polysilazane 140 covering the second side 120 of sheet 102. In either configuration, polysilazane can cover a portion of a side of CFRP sheet 102 or, preferably, the entire side of CFRP sheet 102. Maximum corrosion resistance is achieved by coating an entire side of CFRP sheet 102.

The laminates of this disclosure can be employed in devices in which one or more CFRP sheets are adjacent a metal or metal alloy structure. The resulting devices have improved corrosion resistance compared to such devices that lack the polysilazane coating.

Figure 3A:
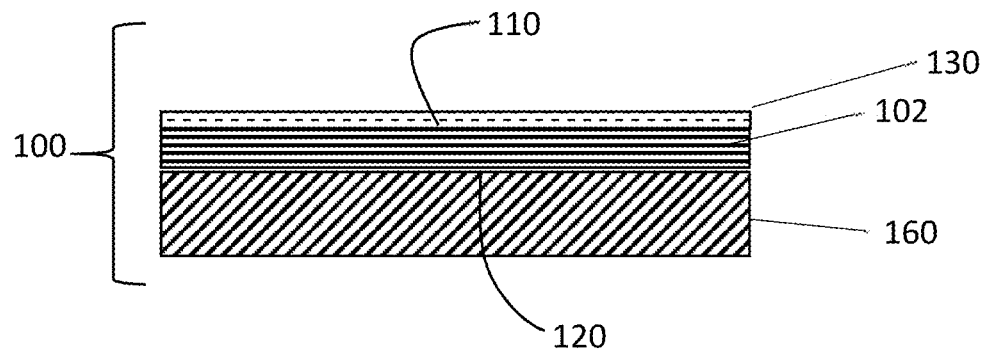
FIGS. 3a, 3b, and 3c are side cutaway views of a laminate adjacent a metal structure.
Figure 3B:
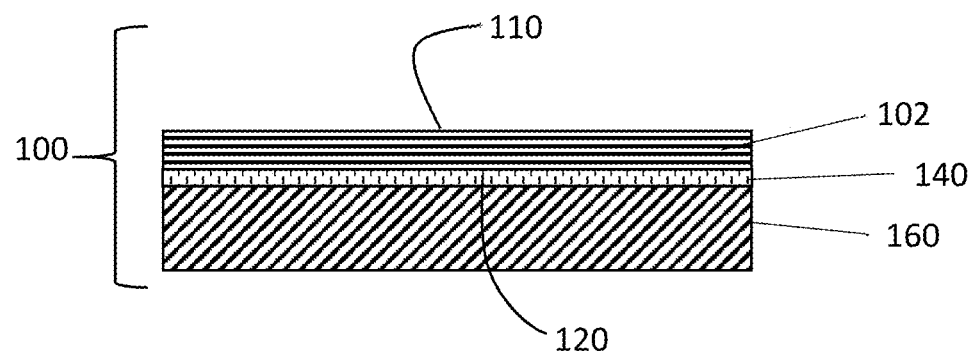
Figure 3C:
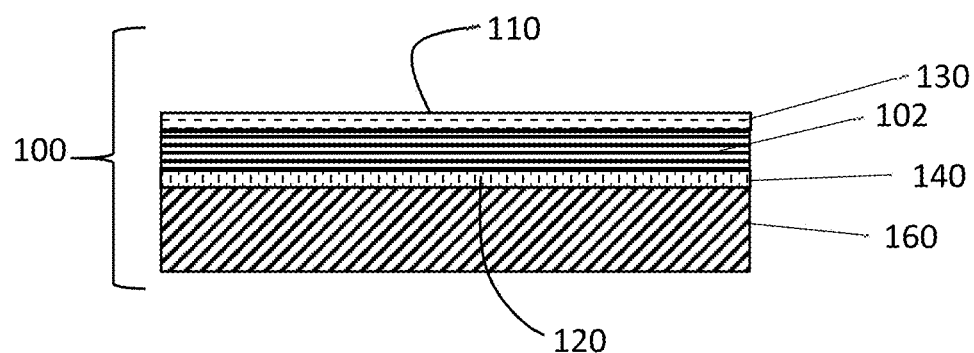

FIGS. 3a-3c depict a single laminate 100 adjacent a metal structure 160. This disclosure also encompasses devices in which to two or more laminates 100 are adjacent metal structure 160, e.g., on opposite sides of metal structure 160. In addition, this disclosure encompasses devices in which a single laminate 100 is adjacent two or more metal structures 160, e.g., a first metal structure adjacent first side 110 and a second metal structure adjacent second side 120.

FIGS. 3a-3c depict a single laminate 100 having different configurations of polysilazane on sheet 102. In FIG. 3a, laminate 100 has polysilazane layer 130 on first side 110 and metal structure 160 is adjacent second side 120. In FIG. 3b, laminate 100 has polysilazane layer 140 on second side 120 and metal structure 160 is adjacent second side 120. In FIG. 3c, laminate 100 has polysilazane layers 130 and 140 on first side 110 second side 120, respectively, and metal structure 160 is adjacent second side 120.

In any of the above configurations, laminate 100 may be in electrical contact with metal structure 160 or electrically insulated from metal structure 160. In many devices electrical insulation is difficult to achieve and, as noted above, at least some minimal electrical connection exists which can lead to oxidation and corrosion of the metal. The polysilazane layer or coating is water-proof and has excellent water-shedding characteristics Laminate 100 therefore can minimize corrosion of metal structure 160 by preventing water from contacting metal structure 160 and CFRP sheet 102 simultaneously and/or by preventing oxygen from reaching carbon fibers within sheet 102, which in turn prevents or minimizes an oxidation-reduction reaction in which the CFRP sheet 102 would function a cathode and metal structure 160 would function as the anode.

Although FIGS. 3a-c show metal structure 160 adjacent second side 120, it can be adjacent first side 110 and/or second side 120 of laminate 100.

Figure 4:
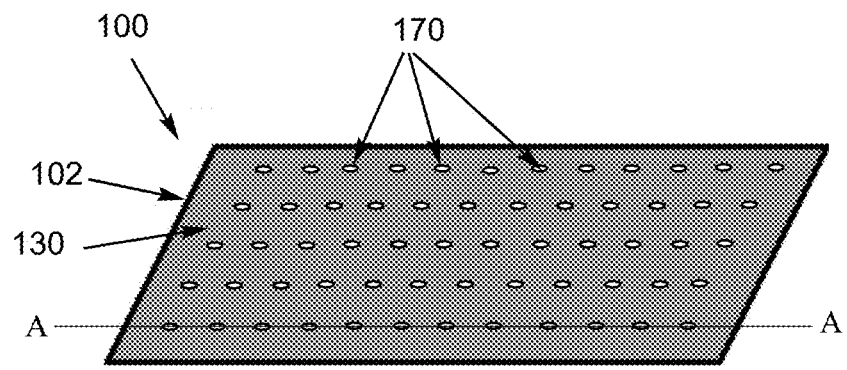
FIG. 4 is a perspective view of a laminate with perforations.

Certain uses of laminate 100 require that sheet 102 have one or more holes or perforations extending at least partially through sheet 102. An example of a laminate having a plurality of perforations 170 is shown in FIG. 4. As explained more fully below, such laminates are useful for making parts of aircraft engines.

Perforations 170 are shaped and sized according to the ultimate use of the device. They can be multi-sided, irregularly shaped, or substantially circular. For example, perforations 170 can have a diameter of from about 0.75 (0.03 in) to about 1.5 mm (0.06 in), or from about 1 mm (0.04 in) to about 1.25 mm (0.05 in).

Figure 4A:
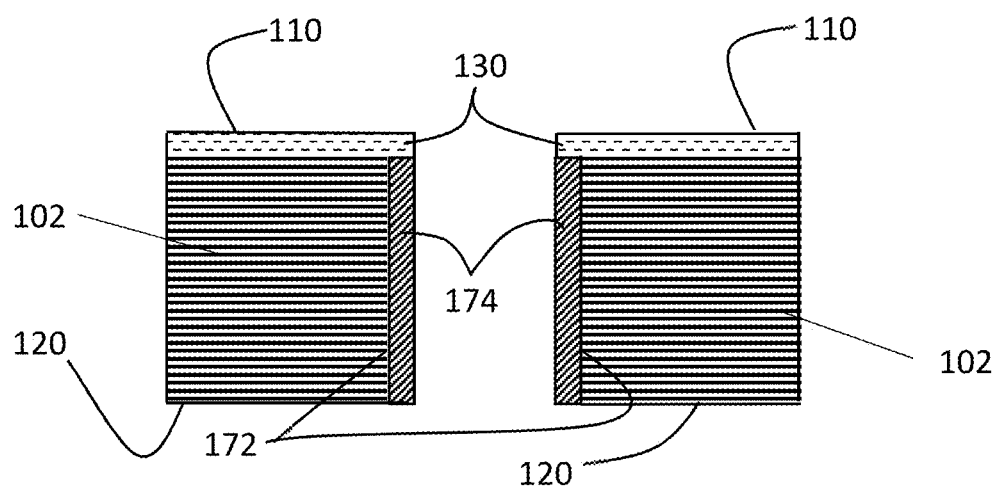
FIG. 4a is a side cutaway view taken along line A-A of FIG. 4 through a perforation in a laminate of this disclosure.

As shown in FIG. 4a, perforations 170 include perforation sidewalls 172. Laminate 100 can be manufactured in a manner that results in a polysilazane sidewall coating 174 on the sidewalls 172 of perforations 170. Polysilazane sidewall coating 174 on sidewalls 172 provides additional waterproofing and water-shedding to the CFRP to further reduce corrosion of a metal structure in contact with the CFRP.

Polysilazane sidewall coating 174 can have a thickness of from about 1-10 µm, from about 1-5 µm, or from about 2-3 µm. Such thicknesses are sufficient to achieve the corrosion-reducing properties of the laminate and only minimally change the diameter of the perforations.

Metal structure 160 can be a metal cellular core, preferably a honeycomb core, such as an aluminum honeycomb core. Honeycomb cores are used in a variety of applications including aircraft and sporting goods, e.g., bicycle disc wheels, skis and snowboards. In certain examples, the metal cellular core is a metal honeycomb core in an aircraft engine thrust reverser. The metal honeycomb core can be aluminum or an aluminum alloy.

Figure 5:
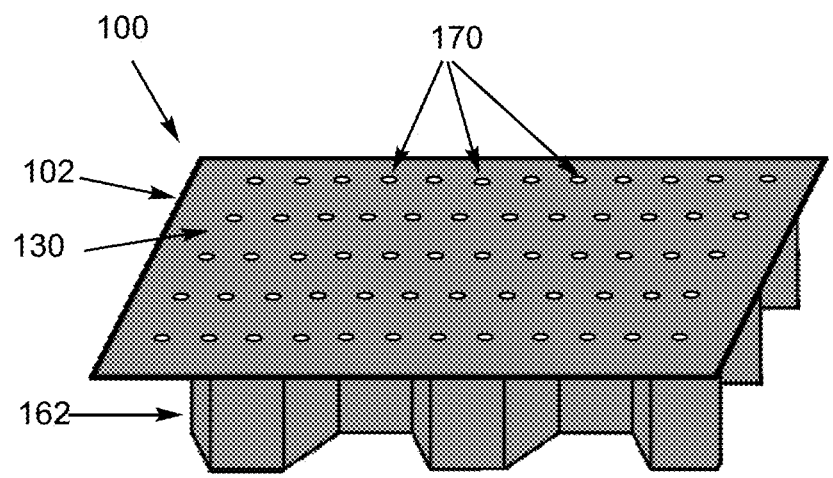
FIG. 5 is a perspective view of a laminate with perforations adjacent a metal structure.

FIG. 5 depicts a device in which metal structure 160 is a honeycomb core 162 and the honeycomb core is adjacent laminate 100. In certain devices, laminate 100 and honeycomb core 162 are physically connected to one another. In some devices, laminate 100 and honeycomb core 162 are physically connected but electrically insulated from each other. Alternatively, laminate 100 can be in electrical contact with honeycomb core 162. As mentioned above, when laminate 100 is in electrical contact with a metal structure such as honeycomb core 162, the polysilazane layer of the laminate provides enhanced corrosion protection to the metal structure.

Sheet 102 of laminate 100 is depicted in FIG. 5 as being perforated; alternatively sheet 102 lacks perforations.

The laminates of this disclosure are particularly useful for manufacturing components of aircraft engine thrust reversers. A thrust reverser wall is a sandwich structure with a top layer, typically of epoxy impregnated perforated carbon fiber fabric, a honeycomb core, and a bottom layer of material that can be epoxy impregnated carbon fiber fabric.

A coating or layer of polysilazane on the CFRP repels water and prevents reduction of oxygen. Where the CFRP sheet and metal structure are components of a thrust reverser wall, and the CFRP sheet is perforated, the combination of the polysilazane coating and the perforations permits the metal to rapidly dry as air flows through the thrust reverser. This prevents water accumulation on the thrust reverser walls and within the reverser core; as a consequence, there will be less corrosion of the core.

Figure 6:
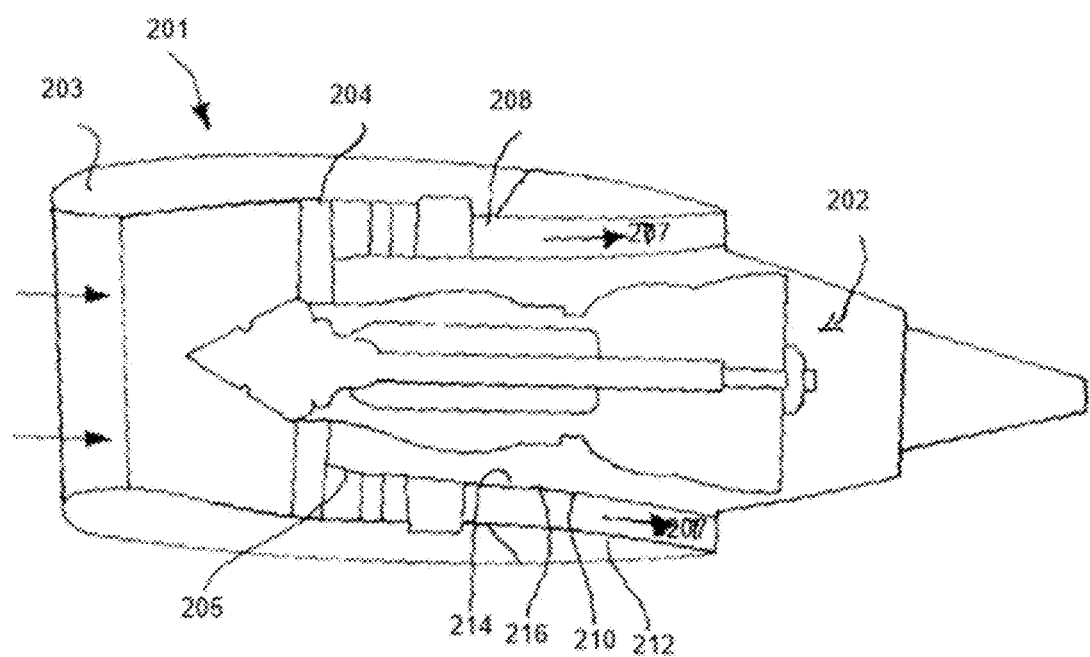
FIG. 6 is a cross section of a commercial aircraft jet power plant.

As seen in FIG. 6, a typical commercial aircraft jet power plant 201 comprises the engine 202, associated cowling 203, fan 204, and thrust reverser cowling 205. The fan 204 draws air through the power plant 201 as indicated by the fan air flow arrows 207. The fan air flow enters cowling 203 and passes through the annular fan air bypass duct 208 between the thrust reverser inner wall 210 and the thrust reverser outer wall 212. Thrust reverser inner wall 210 has an inside surface 214 and an outer surface 216.

Figure 7:
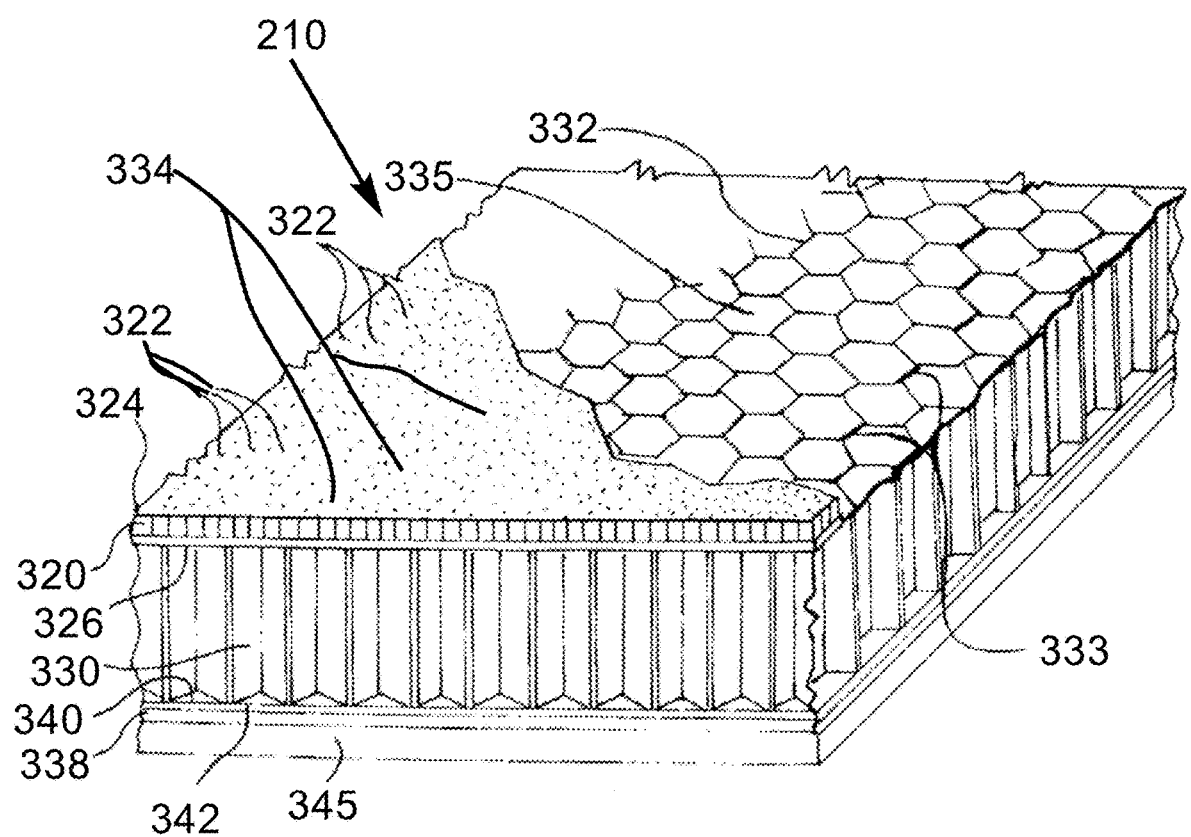
FIG. 7 is an isometric cut away view of a thrust reverser inner wall.
Figure 8:
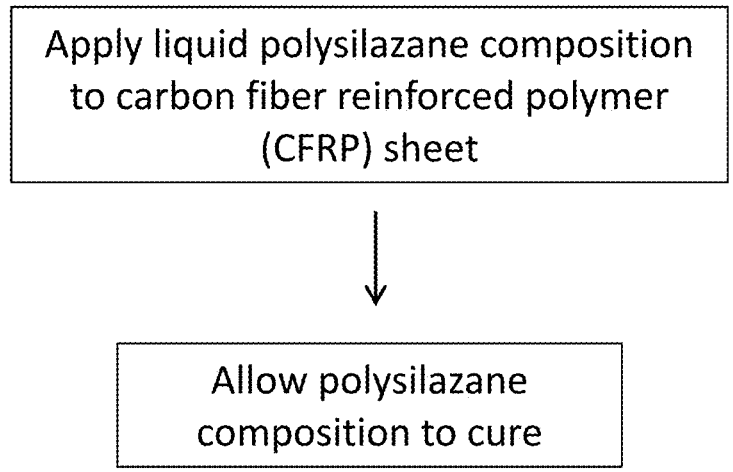
FIG. 8 is a flow chart illustrating an exemplary method for inhibiting oxidation of a metal structure electrically connected to a sheet of carbon fiber reinforced polymer (CFRP)
Figure 9:
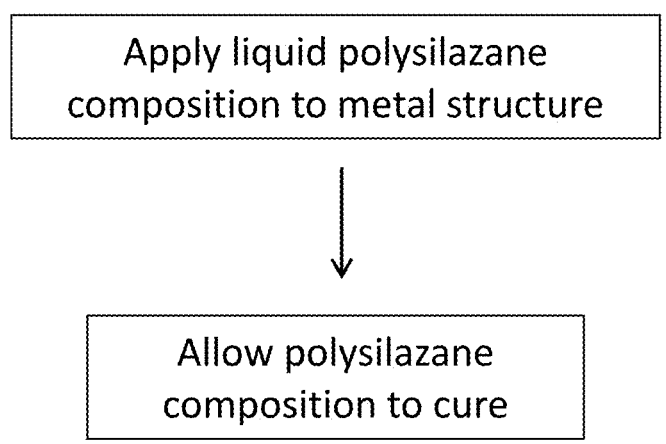
FIG. 9 is a flowchart illustrating an exemplary method for inhibiting oxidation of a metal structure which is adjacent to a sheet of carbon fiber reinforced polymer (CFRP).

As seen in FIG. 7, thrust reverser inner wall 210 is a sandwich structure with a top layer 320 of perforated carbon fiber, typically a carbon fiber reinforced epoxy. Perforations 322 are manufactured into the top layer 320 in any conventional manner, e.g., when the layer is partially cured on a perforation layup tool (not shown). The perforations 322 are designed to maintain proper acoustic properties of the thrust reverser inner wall 210. When installed in the power plant 201, the top face 324 of perforated carbon fiber top layer 320 directly interfaces with the fan air flow 207.

Perforations 322 are substantially circular and are sized to reduce noise produced by air flowing through the cavity adjacent the thrust reverser wall. Preferred perforations 322 have a diameter of from about 0.75 (0.03 in) to about 1.5 mm (0.06 in). More preferably, the perforations have a diameter of from about 1 mm (0.04 in) to about 1.25 mm (0.05 in).

Optimum noise reduction is obtained with perforations covering from about 1-20%, from about 5-18%, or from about 7-14% of the area of wall 210.

A layer of adhesive 236 is typically used to adhere the perforated carbon fiber top layer 320 to a metal, e.g., aluminum or aluminum alloy, honeycomb core 330. The adhesive can be reticulated to maintain the perforated holes after bonding for acoustic characteristics and afford maximum adhesion between the sheet and the metal component. Suitable adhesives include polyimide and bismaleimide adhesive materials.

In certain examples, honeycomb core 330 includes aluminum or aluminum alloy reinforced sheets 332, corrugated to form specific honeycomb cells 335, then bonded with an adhesive resin 333 and coated with the same or a different resin (not shown).

Top layer 320 is coated with a polysilazane to produce a waterproof and water-shedding layer 334 on thrust reverser inner wall 210. Wall 210 is, therefore, a laminate comprising a sheet of CFRP and layer of polysilazane. Polysilazane layer 334 has a thickness of from about 1-10 µm, from about 1-5 µm, or from about 2-3 µm. This thickness minimally changes the diameter of the perforations so that the sound-reducing characteristics of the perforations are maintained.

The polysilazane layer is very water-repellant and allows CFRP laminate wall 210 to rapidly shed water. Rapid shedding of water permits core 330 to rapidly dry out as air flows through the structure. This prevents water accumulation on the thrust reverser walls and within the reverser core; as a consequence, there will be less corrosion of the core.

Because it reduces water-mediated corrosion of the core, layer 334 eliminates or reduces the need for an electrically insulating layer between top layer 320 and honeycomb core 330. However, in certain examples, an optional layer of electrically insulating material (not shown) may be located between the CFRP sheet and the honeycomb core to electrically insulate the core from the CFRP layer. A suitable electrically insulating material is a layer of fiberglass.

Thrust reverser outer wall 212 can also be manufactured to include a laminate as described for inner wall 210.

A base layer 338 is adhered to the bottom surface 340 of honeycomb core 330, for example by a layer of adhesive 342. The base layer may be a CFRP or a metal such as aluminum or aluminum alloy.

In certain examples, the thrust reverser inner wall 210 has an insulation layer 345 adhered to the bottom of base layer 338, wherein the insulation layer is the layer adjacent and closest to the engine 202 when installed in the power plant.

Manufacturing the laminates of this disclosure comprises applying a liquid polysilazane composition to a sheet of CFRP and allowing the composition to cure. Curing of the polysilazane is conveniently carried out at ambient temperature and pressure; curing can also be accelerated with heat.

Suitable solvents for use in the liquid polysilazane composition are inert to the polysilazane, i.e., they function as a carrier for the polysilazane and do not react with the polysilazane. Such solvents include hydrocarbons, $C_1$-$C_6$ alkyl esters of $C_2$-$C_6$ carboxylic acids, and mixtures thereof. Representative hydrocarbons include straight or branched chain $C_7$-$C_{10}$ hydrocarbons (e.g., pentane, hexane, and heptane), cyclic $C_5$-$C_{10}$ saturated hydrocarbons such as cyclopentane, cyclohexane, cycloheptane, etc., and aromatic hydrocarbons such as toluene and xylene. Representative alkyl esters include t-butyl acetate. The liquid polysilazane composition can also contain silanes such as 3-aminopropyltriethoxysilane.

In certain examples, the polysilazane is present in the liquid polysilazane composition at a concentration of about 10-50% by weight of the composition. In other examples, the polysilazane is present in the liquid polysilazane composition at a concentration of about 10-20% by weight of the composition. In other examples, the polysilazane is present in the liquid polysilazane composition at a concentration of about 12-15%, or 13-14%, by weight of the composition.

Suitable liquid polysilazane compositions include Durazane® (e.g., Durazane® 1500 RC and 1500 SC, AGS TutoProm®, and a polysilazane resin/solvent blend commercially available from Huntington Specialty Chemicals as HS-922.

Polysilazanes are polymers in which silicon and nitrogen atoms alternate to form the basic backbone. Each silicon atom is bound to two separate nitrogen atoms and each nitrogen atom is bound to two (2) silicon atoms; consequently both chains and rings of the formula $[R_1R_2Si-NR_3]_n$ occur. $R_1$-$R_3$ independently represent hydrogen atoms or organic substituents. Typical organic substituents are alkyl groups having from 1-6 carbon atoms and unsaturated groups such as allyl and vinyl.

When all the R groups are hydrogen atoms, the polymer is designated as a perhydropolysilazane; perhydropolysilazanes are also known as inorganic polysilazanes and can be represented by the formula $[H_2Si-NH]_n$.

When hydrocarbon substituents are bound to the silicon atoms, the polymers are designated as organopolysilazanes. Organopolysilazanes are also known as organic polysilazanes and can be represented by the formula $[R_1R_2Si-NH]_n$, where $R_1$ and $R_2$ are independently hydrogen or hydrocarbon groups wherein at least one of $R_1$ and $R_2$ is not hydrogen. Preferred $R_1$ and $R_2$ groups are alkyl groups having from 1-6 carbon atoms, vinyl, and allyl.

Suitable polysilazanes for use herein are disclosed in U.S. Pat. Nos. 4,395,460 and 6,329,487.

The polysilsazanes disclosed in U.S. Pat. No. 4,395,460 can be prepared by contacting and reacting in an inert, essentially anhydrous, atmosphere at a temperature in the range of 25° C. to 370° C.:
(A) ammonia and
(B) chlorine-containing disilanes selected from the group consisting of
  (i) a chlorine-containing disilane having the general formula $[Cl_aR_bSi]_2$ and
  (ii) a mixture of chlorine-containing disilanes having the general formula

wherein
  a has a value of 1.5-2.0;
  b has a value of 1.0-1.5;
  the ratio of c to d is in the range of 1:1 to 2:1;
  the sum of a+b is equal to three;
  the sum of c+d is equal to three; and
  R in each case is selected from a group consisting of the vinyl group, an alkyl radical of 1-3 carbon atoms and the phenyl group.

The polysilsazanes disclosed in U.S. Pat. No. 6,329,487 can be prepared by
  a) introducing at least one halosilane having at least one Si—H bond into liquid anhydrous ammonia, the amount of liquid anhydrous ammonia being at least twice the stoichiometric amount of silicon-halide bonds on the halosilane, the halosilane reacting with the anhydrous liquid ammonia to form a precursor ammonolysis product and an ammonium halide salt or acid thereof, the ammonium halide salt or acid thereof being solubilized and ionized in the anhydrous liquid ammonia thereby providing an acidic environment; and
  b) maintaining the precursor ammonolysis product in the acidic environment for a sufficient time to reduce the number of Si—H bonds relative to the quantity of Si—H bonds that are incorporated into the novel silazane and/or polysilazane from the halosilane of step (a).

The polysilazane used to form a polysilazane layer on the CFRP sheet can be an inorganic polysilazane, an organic polysilazane, or a mixture thereof. In some examples, the polysilazane is an inorganic polysilazane, or a mixture thereof.

In other examples, the polysilazane is an organic polysilazane, or a mixture thereof.

During manufacture of a laminate as disclosed herein, the liquid polysilazane composition can be applied to the CFRP sheet at a thickness that produces, upon cure of the polysilazane, a layer of polysilazane having any desired thickness. Preferred thicknesses for the polysilazane layer are about 1-10 μm, about 1-5 μm, or about 2-3 μm. Such thicknesses are sufficient to create an adequate water and oxygen barrier without clogging or otherwise changing the diameter any perforations present in the CFRP sheet. Suitable application rates to afford such layer thicknesses are from about 5-15 mL/m².

While a particular implementation has been described, it will be apparent to persons skilled in the art to which this disclosure pertains that many modifications and variations thereto are possible without departing from the spirit and scope.

Accordingly, the scope of this disclosure should be considered limited only by the spirit and scope of the elements of the appended claims or their reasonable equivalents.

Clause 1. A laminate comprising a sheet of carbon fiber reinforced polymer (CFRP), the sheet having a first side and a second side opposite the first side; and a layer of polysilazane covering one or both of the first side and the second side of the sheet of CFRP.

Clause 2. A laminate according to clause 1, wherein the first side of the sheet of CFRP contains perforations.

Clause 3. A laminate according to clause 1 or clause 2, wherein at least one of the first side and the second side of the sheet of CFRP is in electrical communication with a metal.

Clause 4. A laminate according to clause 2, wherein at least one of the first side and the second side of the sheet is in electrical communication with a metal cellular core or a metal alloy cellular core.

Clause 5. A laminate according to any one of clauses 2-4, wherein the perforations have a diameter of from about 0.75 (0.03 in) to about 1.5 mm (0.06 in).

Clause 6. A laminate according to any one of clauses 2-5, wherein the sidewalls of the perforations are coated with polysilazane.

Clause 7. A laminate according to any one of clauses 1-6, wherein the layer of polysilazane has a thickness of from about 1-10 μm.

Clause 8. A laminate according to any one of clauses 2-7, wherein the perforations cover from about 5-20% of the first side of the sheet.

Clause 9. A laminate according to any one of clauses 1-8, wherein the polysilazane is an inorganic polysilazane, an organic polysilazane, or a mixture thereof.

Clause 10. A laminate according to any one of clauses 1-9, wherein the sheet of CFRP comprises exposed carbon fibers.

Clause 11. A laminate according to any one of clauses 1-10, wherein the metal cellular core comprises aluminum.

Clause 12. A aircraft engine thrust reverser comprising a laminate according to any one of clauses 1-11.

Clause 13. A method for inhibiting oxidation of a metal structure electrically connected to a sheet of carbon fiber reinforced polymer (CFRP), wherein the sheet of CFRP has a first side and a second side and the second side is in electrical communication with the metal structure, the method comprising applying a liquid polysilazane composition to at least the first side of the sheet of CFRP and allowing the composition to cure.

Clause 14. A method according to clause 13, wherein the liquid polysilazane composition comprises an inorganic polysilazane, an organic polysilazane, or a mixture thereof.

Clause 15. A method according to clause 13 or clause 14, wherein the liquid polysilazane composition comprises a solution of a polysilazane and a solvent inert to the polysilazane.

Clause 16. A method according to clause 15, wherein the solvent is selected from hydrocarbons, $C_1$-$C_6$ alkyl esters of $C_2$-$C_6$ carboxylic acids, and mixtures thereof.

Clause 17. A method according to any one of clauses 13-16, wherein the polysilazane is present in the liquid polysilazane composition at a concentration of about 10-50% by weight of the composition.

Clause 18. A method according to any one of clauses 13-16, wherein the polysilazane is present in the liquid polysilazane composition at a concentration of about 10-20% by weight of the composition.

Clause 19. A method according to any one of clauses 13-18, wherein the liquid polysilazane is applied to the first side at a thickness that produces, upon cure of the polysilazane, a layer of polysilazane having a thickness of from about 1-10 μm.

Clause 20. A method according to any one of clauses 13-19, wherein the liquid polysilazane is applied to the first side at a rate of about 5-15 mL/m².

Having described in detail and by reference to specific examples thereof above, it will be apparent from the present disclosure that modifications and variations are possible without departing from the scope defined in the appended claims. More specifically, although some aspects are identified herein as particularly advantageous, it is contemplated that the present disclosure is not necessarily limited to these particular aspects.

What is claimed is:

1. A laminate comprising
   a sheet of carbon fiber reinforced polymer (CFRP), the sheet having a first side and a second side opposite the first side and at least one of the first side and the second side of the sheet is in electrical communication with a metal cellular core or a metal alloy cellular core; and
   a layer of polysilazane covering one or both of the first side and the second side of the sheet of CFRP, wherein the sheet of CFRP contains multiple perforations and at least one of the perforations extends entirely through the sheet, wherein the perforations include sidewalls and the sidewalls of the perforations are coated with polysilazane.

2. A laminate according to claim 1, wherein the perforations have a diameter of from about 0.75 (0.03 in) to about 1.5 mm (0.06 in).

3. A laminate according to claim 2, wherein the layer of polysilazane has a thickness of from about 1-10 μm.

4. A laminate according to claim 3, wherein the perforations cover from about 5-20% of the first side of the sheet.

5. A laminate according to claim 4, wherein the polysilazane is an inorganic polysilazane, an organic polysilazane, or a mixture thereof.

6. A laminate according to claim 5, wherein the sheet of CFRP comprises exposed carbon fibers.

7. A laminate according to claim 6, wherein the metal cellular core comprises aluminum.

8. A laminate according to claim 1, wherein the sheet of CFRP comprises exposed carbon fibers.

9. A aircraft engine thrust reverser comprising a laminate according to claim 1.

10. An aircraft engine thrust reverser according to claim 9, wherein the metal cellular core comprises aluminum.

11. An aircraft engine thrust reverser according to claim 9, wherein the perforations have a diameter of from about 0.75 (0.03 in) to about 1.5 mm (0.06 in).

12. An aircraft engine thrust reverser according to claim 11, wherein the layer of polysilazane has a thickness of from about 1-10 μm.

13. A structure comprising
    a sheet of carbon fiber reinforced polymer (CFRP) coated with a discrete layer of a polysilazane, the sheet having a first side and a second side opposite the first side;
    a metal cellular core or a metal alloy cellular core in electrical communication with at least one of the first side and the second side of the sheet;
    and wherein the layer of polysilazane covers one or both of the first side and the second side of the sheet of CFRP, wherein the sheet of CFRP contains multiple perforations and at least one of the perforations extends entirely through the sheet, wherein the perforations include sidewalls and the sidewalls of the perforations are coated with polysilazane.

14. A structure according to claim 13, wherein the perforations have a diameter of from about 0.75 (0.03 in) to about 1.5 mm (0.06 in).

15. A structure according to claim 14, wherein the layer of polysilazane has a thickness of from about 1-10 μm.

16. A structure according to claim 15, wherein the perforations cover from about 5-20% of the first side of the sheet.

17. A structure according to claim 16, wherein the sheet of CFRP comprises exposed carbon fibers.

18. A structure according to claim 17, wherein the metal cellular core or metal alloy cellular core comprises aluminum.

19. A structure according to claim 13, wherein the perforations have a diameter of from about 1 mm (0.04 in) to about 1.25 mm (0.05 in).

20. A structure according to claim 14, wherein the layer of polysilazane has a thickness of from about 2-3 μm.

* * * * *